United States Patent
Cruz-Hernandez et al.

(10) Patent No.: US 8,884,884 B2
(45) Date of Patent: Nov. 11, 2014

(54) HAPTIC EFFECT GENERATION WITH AN ECCENTRIC ROTATING MASS ACTUATOR

(75) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 712 days.

(21) Appl. No.: 12/269,084

(22) Filed: Nov. 12, 2008

(65) Prior Publication Data

US 2010/0116562 A1 May 13, 2010

(51) Int. Cl.
G06F 3/041 (2006.01)
G06F 3/01 (2006.01)

(52) U.S. Cl.
CPC ..................................... *G06F 3/016* (2013.01)
USPC ........................................................ 345/173

(58) Field of Classification Search
USPC .................................. 345/156–179
See application file for complete search history.

(56) References Cited

U.S. PATENT DOCUMENTS

| | | | | |
|---|---|---|---|---|
| 4,644,246 A | * | 2/1987 | Knapen | 310/75 A |
| 6,429,846 B2 | * | 8/2002 | Rosenberg et al. | 345/156 |
| 6,680,729 B1 | * | 1/2004 | Shahoian et al. | 345/156 |
| 6,982,696 B1 | | 1/2006 | Shahoian | |
| 7,446,752 B2 | * | 11/2008 | Goldenberg et al. | 345/156 |
| 2003/0122779 A1 | | 7/2003 | Martin | |
| 2003/0201975 A1 | * | 10/2003 | Bailey et al. | 345/161 |
| 2003/0231170 A1 | | 12/2003 | Yoshikawa | |
| 2004/0056840 A1 | * | 3/2004 | Goldenberg et al. | 345/156 |
| 2009/0200880 A1 | * | 8/2009 | Mortimer et al. | 310/81 |

FOREIGN PATENT DOCUMENTS

| | | |
|---|---|---|
| DE | 201 02 197 U1 | 6/2001 |
| WO | 01/24158 A1 | 4/2001 |
| WO | 03/047007 A1 | 6/2003 |
| WO | 2008/042745 A2 | 4/2008 |

OTHER PUBLICATIONS

Official Communication issued in the corresponding PCT Application No. PCT/US2009/060973, mailed Nov. 26, 2010.

\* cited by examiner

*Primary Examiner* — Waseem Moorad
(74) *Attorney, Agent, or Firm* — Miles & Stockbridge P.C.

(57) ABSTRACT

A haptically-enabled system includes a touch sensitive surface and an eccentric rotating mass ("ERM") actuator coupled to the touch sensitive surface. The ERM actuator includes a motor, a housing and a constrained mass. The system further includes a drive circuit that creates a haptic effect on the touch sensitive surface by coupling an alternating current signal to the ERM actuator.

19 Claims, 4 Drawing Sheets

HAPTIC EFFECT GENERATION WITH AN ECCENTRIC ROTATING MASS ACTUATOR

FIELD OF THE INVENTION

One embodiment is directed generally to a user interface for a device, and in particular to generating a haptic effect for the user interface.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants ("PDA"s), portable gaming devices, computer tablets, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen-only user interfaces. This shift allows increased flexibility, reduced parts count, and reduced dependence on mechanical buttons that may be more failure-prone due to moving parts, and is in line with emerging trends in product design. A user of a touchscreen, touch pad, or other type of user interface may still desire the familiar touch and feel of mechanical buttons and may require a wide range of effects to provide information regarding the increasing functionality of these devices. In order to generate a wide range of haptic effects, complex actuator mechanisms have been created.

SUMMARY OF THE INVENTION

One embodiment is a haptically-enabled system that includes a touch sensitive surface and an eccentric rotating mass ("ERM") actuator coupled to the touch sensitive surface. The ERM actuator includes a motor, a housing and a constrained mass. The system further includes a drive circuit that creates a haptic effect on the touch sensitive surface by coupling an alternating current signal to the ERM actuator.

DETAILED DESCRIPTION

One embodiment is a system that includes a touch sensitive surface and at least one eccentric rotating mass actuator to generate haptic effects on the touch surface. The mass of the actuator is constrained so that is operates in an inertial mode rather than a spinning mode, and an alternating current is applied. By constraining the mass and applying alternating current, a relatively low-cost off the shelf actuator can be used to create a wide range of haptic effects.

Figure 1:
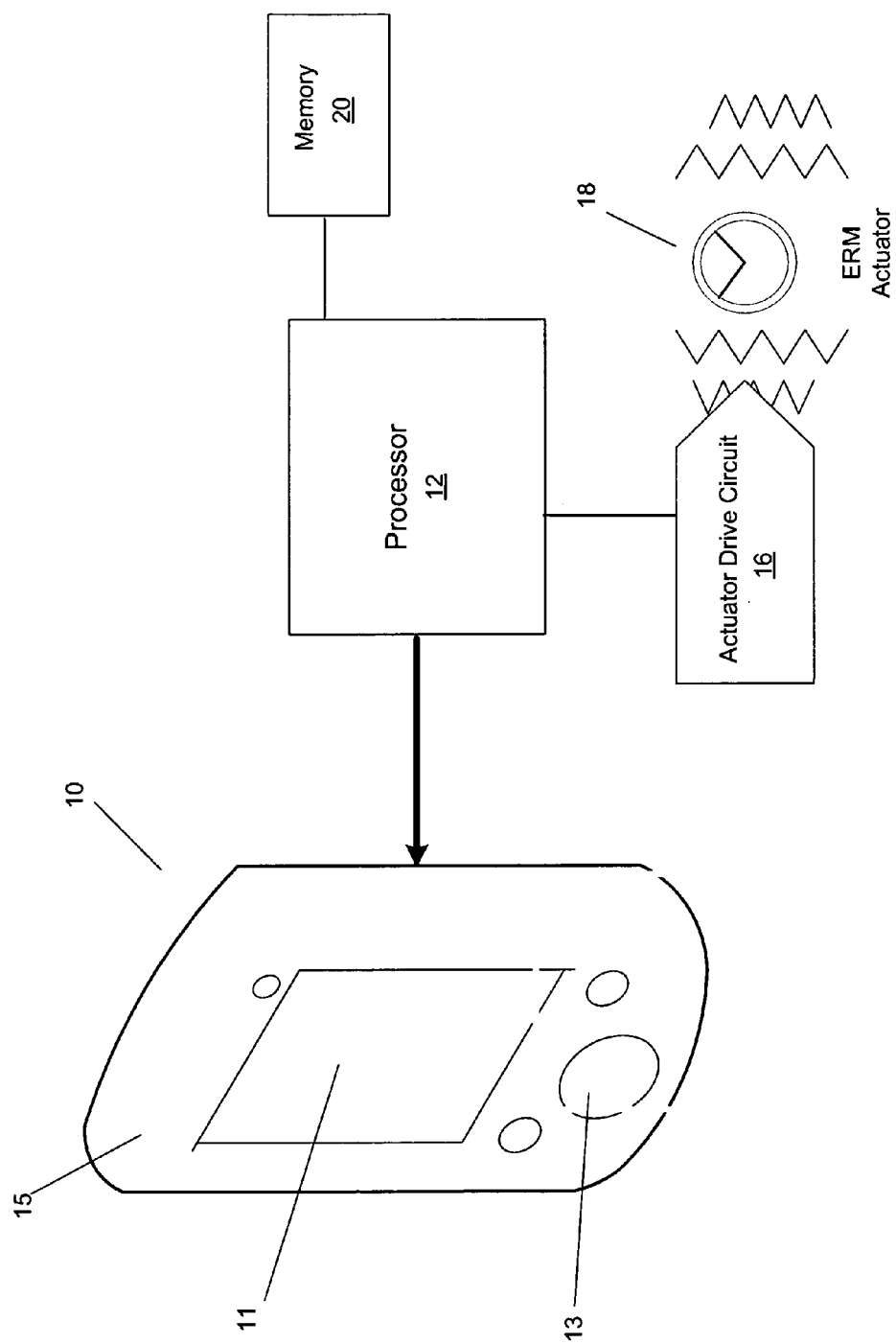
FIG. 1 is a block diagram of a haptically-enabled system in accordance with one embodiment.

FIG. 1 is a block diagram of a haptically-enabled system 10 in accordance with one embodiment. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor 12. Coupled to processor 12 is a memory 20 and an actuator drive circuit 16, which is coupled to an eccentric rotating mass ("ERM") actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16 which includes electronic components and circuitry used to supply ERM actuator 18 with the required electrical current and voltage to cause the desired haptic effects. ERM actuator 18 is a haptic device that generates a vibration on system 10. System 10 may include more than one ERM actuators 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within device 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such as a cellular telephone, PDA, computer tablet, etc. or may be any other type of device that provides a user interface and includes a haptic effect system that includes an ERM actuator. The user interface may be a touch sensitive surface, or can be any other type of user interface such as a mouse, touchpad, mini-joystick, scroll wheel, trackball, etc.

Figure 2:
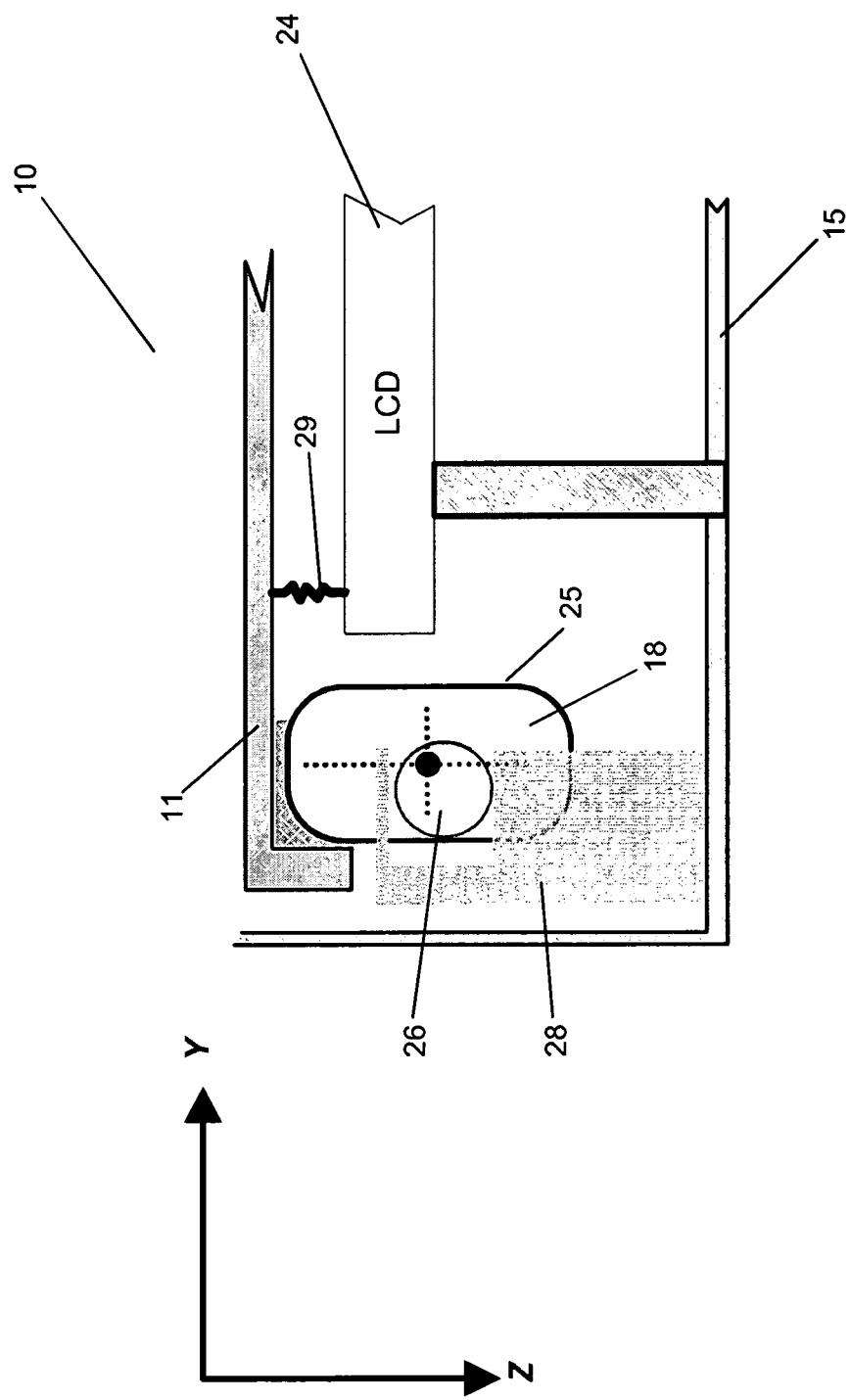
FIG. 2 is a side cut-away view of the haptically-enabled system in accordance with one embodiment.

In one embodiment, ERM actuator 18 is coupled to the rest of system 10 in such a manner that the rotation of the mass is constrained so that vibrations are generated on touch surface 11 via an inertial effect. FIG. 2 is a side cut-away view of system 10 in accordance with one embodiment.

Touch surface 11 of system 10 in one embodiment is coupled to an underlying liquid crystal display ("LCD") 24 that displays information. Touch surface 11 and LCD 24 are separated by a suspension 29 that allows touch surface 11 to move when actuator 18 is activated, and LCD 24 is coupled to housing 15. In one embodiment, suspension 29 is a soft foam silicon material, a closed cell silicon material, a poron foam, etc. In other embodiments, a spring or other mechanism can be used to suspend touch surface 11 from LCD 24. In embodiments that include a touch sensitive surface without underlying information, such as a touch pad on a computer or a touch panel in an appliance, LCD 24 is not needed and touch surface 11 can be suspended directly from housing 15.

ERM 18 includes a housing 25 coupled to touch surface 11 and an eccentric mass 26. In a typical prior art application, a constant direct current ("DC") voltage is applied to ERM 18, causing mass 26 to rotate along the Z-Y plane, and creating a vibrational haptic effect on touch sensitive surface 11. However, this causes ERM 18 to have a predetermined frequency response that cannot be modified if necessary to create a wider range of haptic effects. In contrast to the prior art, in one embodiment device 10 includes a soft stop 28 that surrounds mass 26, thus constraining mass 26 and preventing it from rotating. Alternating current ("AC") is applied to ERM 18, which allows the magnitude and frequency content to be decoupled. Soft stop 28 constrains mass 26 to movement substantially in the Z direction, which causes force to be applied to touch surface 11 through ERM housing 25.

In one embodiment, soft stop 28 is formed of poron foam. However, in other embodiments, other mechanisms can be used to constrain mass 26, such as a constraining means on the shaft of the ERM motor, or through the attachment of springs to mass 26.

In one embodiment, ERM 18 is a DC motor with sufficiently high torque, and includes eccentric mass 26 attached to the shaft of the motor. Actuator 18 is driven with an AC signal (i.e., bidirectional signal) ideally at a specified frequency related to the resonance of the entire system 10 (e.g., touch surface 11 plus suspension 29). When the AC signal moves moving mass 26 of the actuator, a high torque is produced over the inertia of system 10, generating reaction forces in eccentric mass 26, thus also generating reaction acceleration in the form of high acceleration pulses that are transmitted to touch surface 11 through the body of DC motor actuator 18. In one embodiment, the shaft of the motor will not move more than a few degrees (i.e., less than 10 degrees), thus it never rotates as an ERM actuator would do in a prior art system. In one embodiment, the shaft of the motor functions as the "mass", and mass 26 is not needed.

Figure 3:
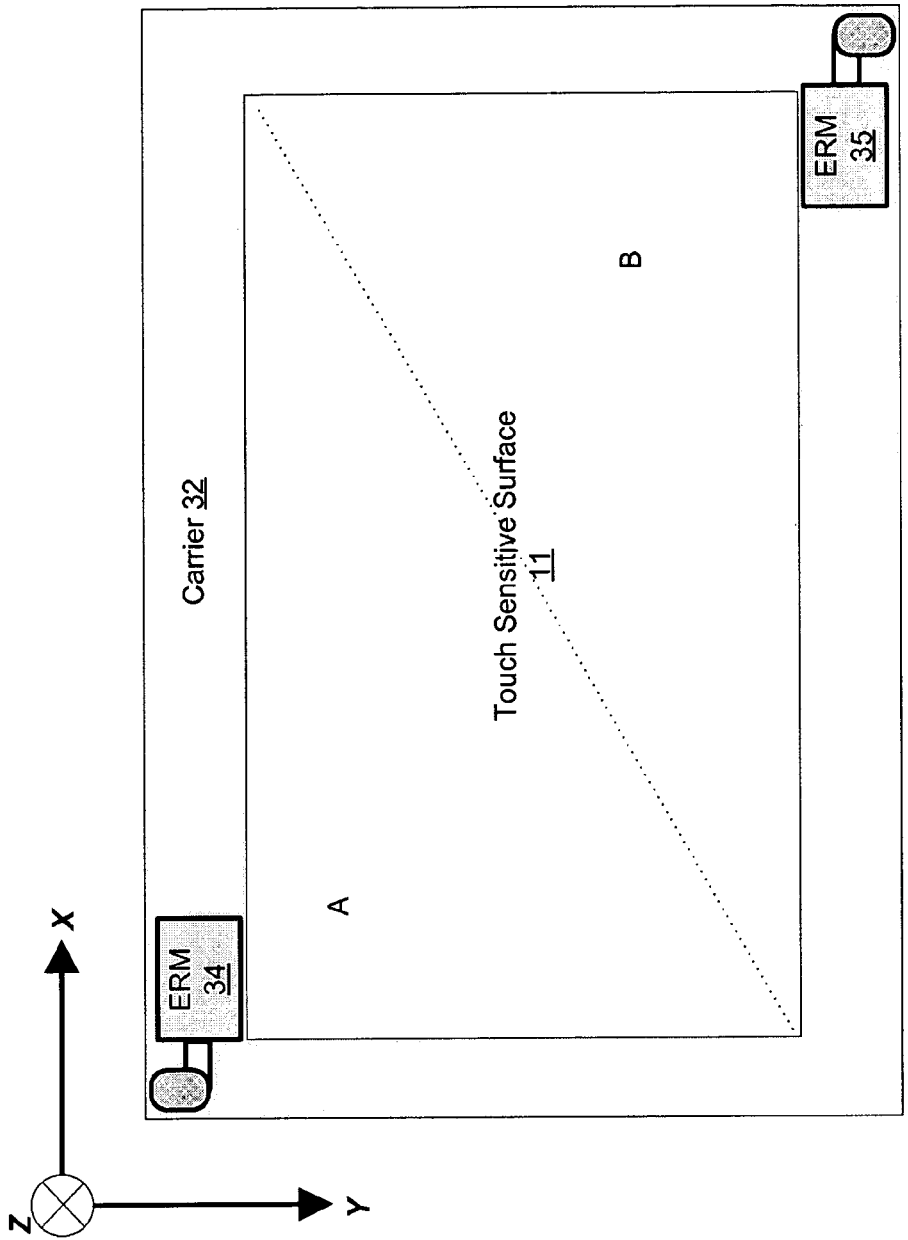
FIG. 3 is a top view of the haptically-enabled system in accordance with one embodiment.

In one embodiment, multiple ERMs 18 are coupled to touch sensitive surface 11 as shown in FIG. 2 in order to create a haptic effect across the entire surface. FIG. 3 is a top view of system 10 which includes touch sensitive surface 11, a carrier 32 surrounding touch sensitive surface 11, and two ERMs 34, 35 coupled to touch sensitive surface 11. ERMs 34, 35 in one embodiment are the same as ERM 18 and have a constrained mass. As shown in FIG. 3, ERMs 34, 35 are located at opposite corners of surface 11. In general, ERM 34 will apply a uniform haptic effect to region A relative to the diagonal line, while ERM 35 will apply a uniform haptic effect to region B. Therefore, the location of ERMs 34 and 35 at opposite corners of touch surface 11 will provide a general uniform haptic effect across the entire surface 11. Further, by constraining the masses of ERMs 34 and 35, signals can easily be generated so that ERMs 34, 35 act synchronously to create nondestructive interference. In general, for non-rectangular shaped surfaces (e.g., circular or triangular shapes), the ERMs should be placed as far apart as possible on the surface to create the most uniform haptic effect.

Figure 4:
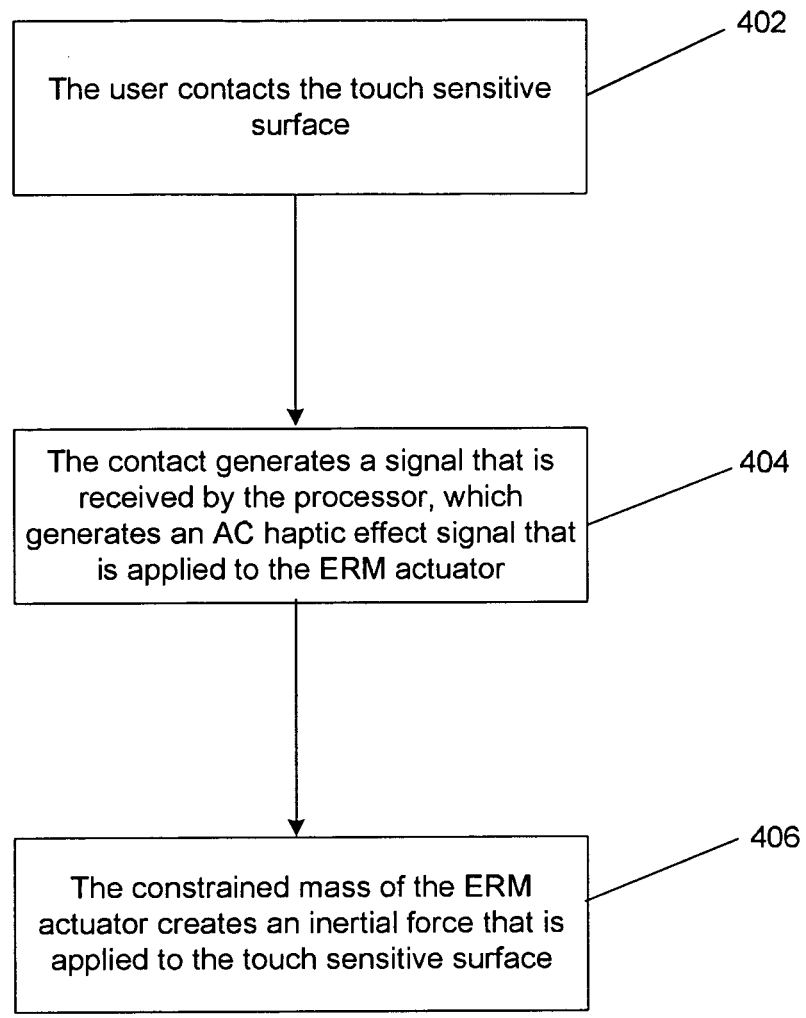
FIG. 4 is a flow diagram of the functionality performed by the system of FIG. 1 in accordance with one embodiment in order to create a wide range of haptic effects.

FIG. 4 is a flow diagram of the functionality performed by system 10 of FIG. 1 in accordance with one embodiment in order to create a wide range of haptic effects. In one embodiment, the functionality of FIG. 4 can be performed by any combination of hardware and software.

At 402, the user contacts touch sensitive surface 11 or other type of user interface on system 10.

At 404, the contact at 402 generates a signal that is received by processor 12. In response, processor 12 in combination with actuator drive circuit 16 generates an AC haptic effect signal. The haptic effect signal can range from a simple pulse to simulate a key press to a complex dynamic haptic effect. The haptic effect signal is applied to ERM actuator 18.

At 406, in response to the haptic effect signal, the constrained mass of ERM actuator 18 creates an inertial force that is applied to the touch sensitive surface.

As disclosed, a haptically-enable device includes an ERM with a constrained mass coupled to a touch sensitive surface. The inertia of the constrained mass generates a wide range of haptic effects on the touch sensitive surface. Multiple ERMs spaced as far apart as possible on the touch sensitive surface allow the haptic effects to be uniform across the entire surface.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. An apparatus comprising:
    a touch sensitive surface;
    a first eccentric rotating mass (ERM) actuator coupled to the touch sensitive surface, the first ERM actuator comprising a motor, an ERM housing, a shaft and a mass coupled to the shaft that is adapted to rotate on an axis;
    a constraining device coupled to the mass; and
    a drive circuit adapted to generate an alternating current (AC) signal coupled to the ERM actuator;
    wherein the constraining device prevents the mass from a complete rotation on the axis when the signal is coupled and generates vibrations on the touch sensitive surface via an inertial force through the ERM housing;
    wherein the constraining device substantially limits a rotation of the mass to a direction along a perpendicular axis that is generally perpendicular to the touch sensitive surface, wherein the inertial force is applied generally along the perpendicular axis, and the constraining device limits movement of the mass in both directions of the perpendicular axis by constraining the mass on both sides of the perpendicular axis relative to the mass;

wherein the AC signal is bidirectional and drives the mass in both directions of the perpendicular axis.

2. The apparatus of claim 1, further comprising a housing coupled to the touch sensitive surface, wherein the housing is coupled to the touch sensitive surface via a suspension.

3. The apparatus of claim 1, wherein the mass is constrained via a soft stop.

4. The apparatus of claim 2, wherein the suspension comprises a foam.

5. The apparatus of claim 3, wherein the soft stop comprises a foam.

6. The apparatus of claim 1, wherein the mass in constrained via at least one spring.

7. The apparatus of claim 1, wherein a coupling of the AC signal to the first ERM is adapted to generate inertial forces on the ERM housing, and transfer the inertial forces to the touch sensitive surface to create a haptic effect.

8. The apparatus of claim 7, wherein the coupling of the AC signal is in response to a sensed touch of the touch sensitive surface.

9. The apparatus of claim 1, further comprising a processor coupled to the drive circuit and a memory coupled to the processor, wherein the memory stores instructions that when executed by the processor cause haptic effect signals to be input to the drive circuit.

10. The apparatus of claim 1, further comprising a second ERM actuator, wherein the first ERM actuator and second ERM actuator are positioned on the touch sensitive surface substantially as far apart as possible.

11. The apparatus of claim 10, wherein the touch sensitive surface is rectangular having four corners, and the first ERM actuator is positioned at a first corner and the second ERM actuator is positioned at a second corner, wherein the first corner and the second corner are opposite corners.

12. A method of generating a haptic effect comprising:
receiving a signal that indicates that a user has contacted a touch sensitive surface;
in response to the first signal, generating a haptic effect signal that comprises an alternating current (AC) signal;
coupling the haptic effect signal to a first eccentric rotating mass (ERM) actuator that comprises a mass adapted to rotate around an axis; and
generating an inertial force from the ERM actuator and coupling the inertial force to the touch sensitive surface through the ERM housing;
wherein the mass is constrained to prevent the mass from completing a full rotation around the axis when the signal is coupled, and the inertial force is generated by movement of the constrained mass;
wherein the mass is constrained to substantially limit a rotation of the mass to a direction along a perpendicular axis that is generally perpendicular to the touch sensitive surface, wherein the inertial force is applied generally along the perpendicular axis, and the constraining device limits movement of the mass in both directions of the perpendicular axis by constraining the mass on both sides of the perpendicular axis relative to the mass;
wherein the AC signal is bidirectional and drives the mass in both directions of the perpendicular axis.

13. The method of claim 12, wherein the mass is constrained via a soft stop.

14. The method of claim 13, wherein the soft stop comprises a foam.

15. The method of claim 12, wherein the mass in constrained via at least one spring.

16. A touch sensitive device comprising:
means for receiving a signal that indicates that a user has contacted a touch sensitive surface;
in response to the first signal, means for generating a haptic effect signal that comprises an alternating current (AC) signal;
means for coupling the haptic effect signal to a first eccentric rotating mass (ERM) actuator that comprises a constrained mass; and
means for generating an inertial force from the ERM actuator and coupling the inertial force to the touch sensitive surface through the ERM housing;
wherein the mass is constrained from completing a full rotation around an ERM axis when the signal is coupled, and the inertial force is generated by movement of the constrained mass;
wherein the mass is constrained to substantially limit a rotation of the mass to a direction along a perpendicular axis that is generally perpendicular to the touch sensitive surface, wherein the inertial force is applied generally along the perpendicular axis, and the constraining device limits movement of the mass in both directions of the perpendicular axis by constraining the mass on both sides of the perpendicular axis relative to the mass;
wherein the AC signal is bidirectional and drives the mass in both directions of the perpendicular axis.

17. The apparatus of claim 1, wherein the perpendicular axis generally comprises a first direction of movement and a second direction of movement, and the constraining device constrains the mass in the first direction and the second direction.

18. The method of claim 12, wherein the perpendicular axis generally comprises a first direction of movement and a second direction of movement, and the mass is constrained in the first direction and the second direction.

19. The device of claim 16, wherein the perpendicular axis generally comprises a first direction of movement and a second direction of movement, and the mass is constrained in the first direction and the second direction.

* * * * *